(12) United States Patent
Koide et al.

(10) Patent No.: US 12,007,654 B2
(45) Date of Patent: *Jun. 11, 2024

(54) DISPLAY DEVICE AND SUBSTRATE OF DISPLAY DEVICE

(71) Applicant: Japan Display Inc., Tokyo (JP)

(72) Inventors: Gen Koide, Tokyo (JP); Hiroyuki Abe, Tokyo (JP); Kazune Matsumura, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/300,710

(22) Filed: Apr. 14, 2023

(65) Prior Publication Data

US 2023/0251534 A1 Aug. 10, 2023

Related U.S. Application Data

(63) Continuation of application No. 17/726,633, filed on Apr. 22, 2022, now Pat. No. 11,656,510, which is a
(Continued)

(30) Foreign Application Priority Data

Jul. 13, 2018 (JP) .................................. 2018-133143

(51) Int. Cl.
*G02F 1/1345* (2006.01)
*G02F 1/1362* (2006.01)
*G09G 3/36* (2006.01)

(52) U.S. Cl.
CPC ........ *G02F 1/13452* (2013.01); *G02F 1/1345* (2013.01); *G02F 1/136286* (2013.01); *G09G 3/3677* (2013.01); *G09G 2300/0426* (2013.01)

(58) Field of Classification Search
None
See application file for complete search history.

(56) References Cited

U.S. PATENT DOCUMENTS 5,113,134 A 5/1992 Plus et al.
5,576,730 A 11/1996 Shimada et al.
(Continued)

FOREIGN PATENT DOCUMENTS

JP 2011-053614 A 3/2011
JP 2016-004071 A 1/2016

OTHER PUBLICATIONS

Office Action dated Sep. 27, 2021 in Chinese Application No. 201910619628.2 (w/English translation).
(Continued)

*Primary Examiner* — Dung T Nguyen
(74) *Attorney, Agent, or Firm* — Maier & Maier, PLLC

(57) ABSTRACT

According to an aspect, a display device includes: a first substrate having a first side and a second side opposed to the first side; a display region provided with pixels; a first partial peripheral region between the first side and the display region; a second partial peripheral region between the second side and the display region; a plurality of signal lines configured to supply signals to switching elements in the pixels; a plurality of first terminals provided in the first partial peripheral region and configured to be electrically coupled to a driver integrated circuit; a plurality of second terminals provided in the second partial peripheral region and configured to be supplied with signals for inspection; and a first coupling circuit provided between the first terminals and the display region in the first partial peripheral region and configured to switch between coupling and decoupling the signal lines and the second terminals.

8 Claims, 13 Drawing Sheets

Related U.S. Application Data continuation of application No. 17/062,682, filed on Oct. 5, 2020, now Pat. No. 11,340,505, which is a continuation of application No. 16/508,989, filed on Jul. 11, 2019, now Pat. No. 10,831,076.

(56) References Cited

U.S. PATENT DOCUMENTS

| | | |
|---|---|---|
| 7,649,585 B2 | 1/2010 | Jeoung et al. |
| 9,581,841 B2 | 2/2017 | Yanagisawa |
| 10,831,076 B2 | 11/2020 | Koide et al. |
| 10,838,275 B2 | 11/2020 | Koide et al. |
| 11,340,505 B2 | 5/2022 | Koide et al. |
| 11,656,510 B2 * | 5/2023 | Koide ............... G02F 1/136286 349/151 |
| 2004/0046920 A1 | 3/2004 | Hayata et al. |
| 2009/0096770 A1 | 4/2009 | Kawabe |
| 2013/0328051 A1 | 12/2013 | Flanklin et al. |
| 2015/0362812 A1 | 12/2015 | Aoki et al. |

OTHER PUBLICATIONS

Office Action dated Mar. 22, 2022 in Japanese Application No. 2018-133143 (w/English translation).

\* cited by examiner

DISPLAY DEVICE AND SUBSTRATE OF DISPLAY DEVICE

CROSS-REFERENCE TO RELATED APPLICATIONS

This application is a continuation of and claims the benefit of priority under 35 U.S.C. § 120 from U.S. application Ser. No. 17/726,633 filed on Apr. 22, 2022, which is a continuation of U.S. application Ser. No. 17/062,682 filed on Oct. 5, 2020 (now U.S. Pat. No. 11,340,505 issued May 24, 2022), which is a continuation of U.S. application Ser. No. 16/508,989 filed on Jul. 11, 2019 (now U.S. Pat. No. 10,831,076 issued Nov. 10, 2020), and claims the benefit of priority under 35 U.S.C. § 119 from Japanese Application No. 2018-133143 filed Jul. 13, 2018, the contents of each of which are incorporated by reference herein in its entirety.

BACKGROUND

1. Technical Field

What is disclosed herein relates to a display device and a substrate of a display device.

2. Description of the Related Art

In recent years, demand has increased for higher-density (higher-definition) pixels for display devices, each using a liquid crystal display panel, an organic electroluminescent display (OELD) panel, micro light-emitting diodes (LEDs), or mini LEDs. With such an increase in definition of the display devices, the numbers of video signal lines and scan lines have increased, and the number of pins of driver integrated circuits (ICs) for driving the video signal lines and the scan lines has also increased. For example, according to U.S. Patent Application Publication No. 2013/0328051, a plurality of driver ICs are provided on an array substrate. The driver ICs are disposed along a substrate side with a notch provided on the substrate side interposed therebetween.

Japanese Patent Application Laid-open Publication No. 2016-004071 discloses a structure provided with a coupling terminal coupled to a flexible printed circuit (FPC) on each of one side and another side of a display device in order to downsize the display device and/or reduce restrictions when the display device is assembled into another device.

The display device is further provided with terminals and a circuit for inspection. The terminals for inspection can be used to inspect various types of wiring, such as signal lines, and coupling circuitry coupled to a plurality of signal lines. At the same time, portable electronic apparatuses such as smartphones are desired to have narrower bezels, in addition to higher definition. Consequently, the terminals and the circuit for panel inspection may be more difficult to be efficiently disposed.

SUMMARY

According to an aspect, a display device includes: a first substrate having a first side and a second side opposed to the first side; a display region provided with a plurality of pixels; a first partial peripheral region between the first side of the first substrate and the display region; a second partial peripheral region between the second side of the first substrate and the display region; a plurality of signal lines configured to supply signals to respective switching elements provided in the pixels; a plurality of first terminals provided in the first partial peripheral region and configured to be electrically coupled to a driver integrated circuit; a plurality of second terminals provided in the second partial peripheral region and configured to be supplied with signals for inspection; and a first coupling circuit provided between the first terminals and the display region in the first partial peripheral region and configured to switch between coupling and decoupling the signal lines and the second terminals.

According to another aspect, a substrate of a display device, the substrate includes: a first substrate having a first side and a second side opposed to the first side; a second substrate opposed to the first substrate; a display region provided with a plurality of pixels; a first partial peripheral region between the first side of the first substrate and the display region; a plurality of signal lines configured to supply signals to respective switching elements provided in the pixels; a plurality of first terminals provided in the first partial peripheral region and configured to be electrically coupled to a driver integrated circuit; a plurality of second terminals provided between the first side and the first terminals and configured to be supplied with signals for inspection; and a first coupling circuit configured to switch between coupling and decoupling the first terminals and the second terminals.

According to still another aspect, A display device includes: a first substrate having a first side and a second side opposed to the first side; a display region provided with a plurality of pixels; a first partial peripheral region between the first side of the first substrate and the display region; a second partial peripheral region between the second side of the first substrate and the display region; a plurality of signal lines configured to supply signals to respective switching elements provided in the pixels; a plurality of first terminals provided in the first partial peripheral region and configured to be electrically coupled to a driver integrated circuit; a plurality of second terminals provided in the second partial peripheral region and configured to be supplied with signals for inspection; and a first coupling circuit provided between the second terminals and the display region in the second partial peripheral region and configured to switch between coupling and decoupling the signal lines and the second terminals.

DETAILED DESCRIPTION

Figure 1:
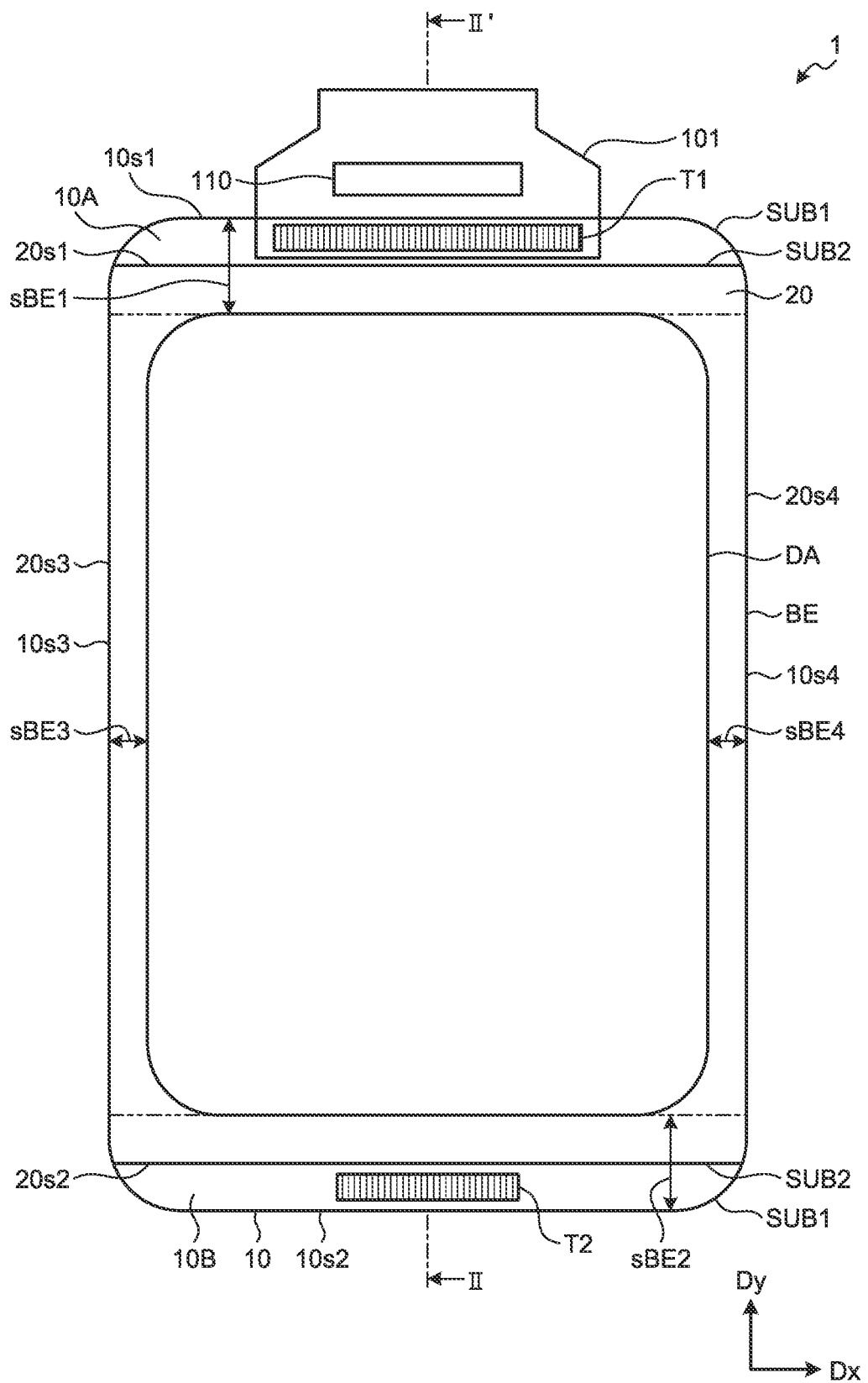
FIG. 1 is a plan view schematically illustrating a display device according to a first embodiment of the present disclosure.

The following describes modes (embodiments) for carrying out the present disclosure in detail with reference to the drawings. The present disclosure is not limited to the description of the embodiments to be given below. Components to be described below include those easily conceivable by those skilled in the art or those substantially identical thereto. Moreover, the components to be described below can be appropriately combined. The disclosure is merely an example, and the present disclosure naturally encompasses in the scope of the present disclosure, appropriate modifications easily conceivable by those skilled in the art while maintaining the gist of the disclosure. To further clarify the description, widths, thicknesses, shapes, and the like of various parts are schematically illustrated in the drawings as compared with actual aspects thereof, in some cases. They are merely examples, and interpretation of the present disclosure is not limited thereto. The same element as that illustrated in a drawing that has already been discussed is denoted by the same reference numeral or character through the description and the drawings, and detailed description thereof will not be repeated in some cases where appropriate.

In this disclosure, when an element is described as being "on" another element, the element can be directly on the other element, or there can be one or more elements between the element and the other element.

First Embodiment

Figure 2:
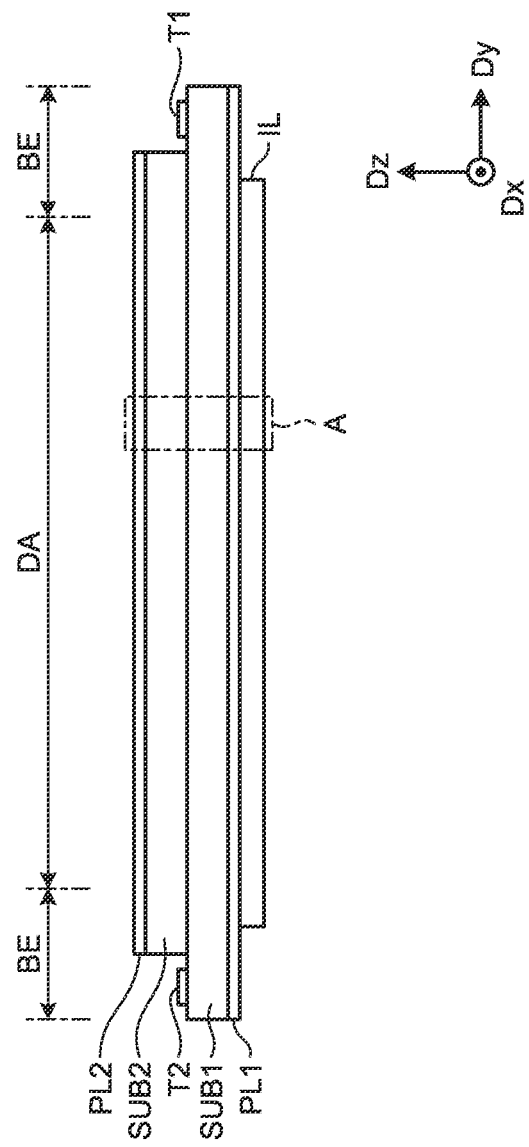
FIG. 2 is a sectional view taken along line II-II' in FIG. 1.
Figure 3:
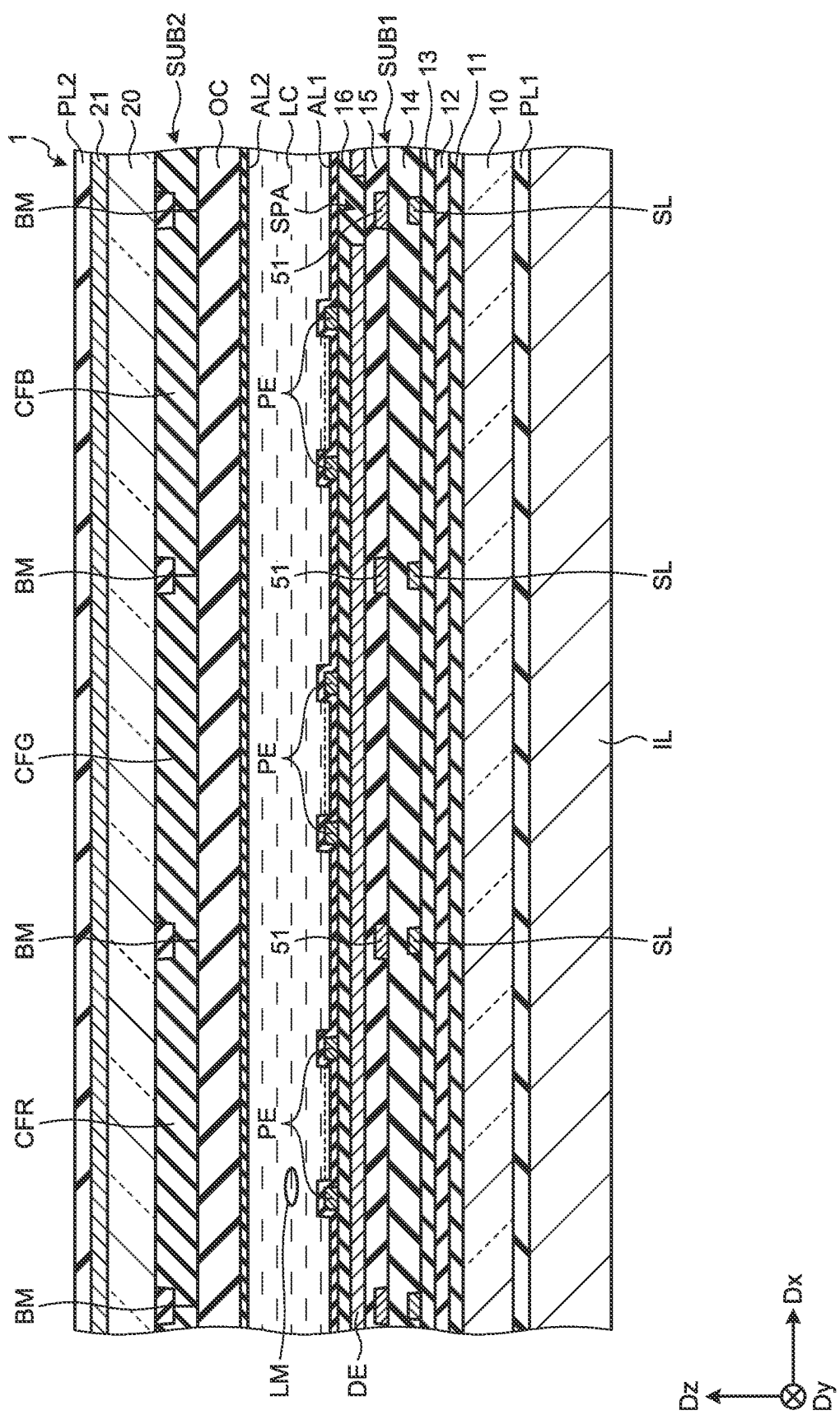
FIG. 3 is a sectional view illustrating a region A of FIG. 2 in a magnified manner.

FIG. 1 is a plan view schematically illustrating a display device according to a first embodiment of the present disclosure. FIG. 2 is a sectional view taken along line II-II' in FIG. 1. FIG. 3 is a sectional view illustrating a region A of FIG. 2 in a magnified manner. As illustrated in FIG. 1, a display device 1 includes an array substrate SUB1 and a counter substrate SUB2. In the display device 1, a peripheral region BE is provided outside a display region DA. The display region DA is formed in a substantially quadrilateral shape with its corner portions formed in curved shapes, but the outer shape of the display region DA is not limited thereto. For example, the display region DA may have a notch. Alternatively, the display region DA may be formed in another polygonal shape, or may be formed in another shape, such as a circular shape or an oval shape.

In this embodiment, a first direction Dx is a direction along short sides of the display region DA. A second direction Dy is a direction intersecting (or orthogonal to) the first direction Dx. The second direction Dy is not limited to this direction, and may intersect the first direction Dx at an angle other than 90 degrees. A plane defined by the first direction Dx and the second direction Dy is parallel to a surface of the array substrate SUB1. A third direction Dz orthogonal to the first direction Dx and the second direction Dy is a thickness direction of the array substrate SUB1.

The display region DA is a region for displaying an image, and is a region overlapping a plurality of pixels PX. The peripheral region BE is a region located inside an outer circumference of the array substrate SUB1 and outside the display region DA. The peripheral region BE may have a frame-like shape surrounding the display region DA. In that case, the peripheral region BE can be called a frame region.

A first insulating substrate 10 included in the array substrate SUB1 has a first side 10s1, a second side 10s2, a third side 10s3, and a fourth side 10s4. The first side 10s1 extends along the first direction Dx in a plan view. The second side 10s2 is opposed to the first side 10s1. The third side 10s3 extends along the second direction Dy. The fourth side 10s4 is opposed to the third side 10s3. In the same way, a second insulating substrate 20 included in the counter substrate SUB2 has a first side 20s1, a second side 20s2, a third side 20s3, and a fourth side 20s4.

The peripheral region BE includes a first partial peripheral region sBE1, a second partial peripheral region sBE2, a third partial peripheral region sBE3, and a fourth partial peripheral region sBE4. In this embodiment, the first partial peripheral region sBE1 is a region between the first side 10s1 and an imaginary line (represented by a long dashed double-short dashed line) obtained by extending a straight line portion of one of the short sides of the display region DA. The second partial peripheral region sBE2 is a region between the second side 10s2 and an imaginary line obtained by extending a straight line portion of the other of the short sides of the display region DA. The third partial peripheral region sBE3 and the fourth partial peripheral region sBE4 are regions between the first partial peripheral region sBE1 and the second partial peripheral region sBE2, and are provided along the third side 10s3 and the fourth side 10s4, respectively.

As illustrated in FIGS. 1 and 2, the length in the second direction Dy of the array substrate SUB1 is greater than the length in the second direction Dy of the counter substrate SUB2. The first side 20s1 and the second side 20s2 of the second insulating substrate 20 are disposed between the first side 10s1 and the second side 10s2 of the first insulating substrate 10 in the second direction Dy. In other words, the first insulating substrate 10 has a first extension portion 10A and a second extension portion 10B. The first extension portion 10A is a portion extending outside the first side 20s1 of the second insulating substrate 20 in the plan view. The second extension portion 10B is a portion extending outside the second side 20s2 of the second insulating substrate 20 on the opposite side to the first extension portion 10A with respect to the second insulating substrate 20.

The first extension portion 10A is provided with a plurality of first terminals T1. The second extension portion 10B is provided with a plurality of second terminals T2. The first terminals T1 are arranged in the first direction Dx along the first side 10s1 in the first partial peripheral region sBE1. The first extension portion 10A is provided with a wiring substrate 101. The wiring substrate 101 is made up of, for example, flexible printed circuits (FPCs). The wiring substrate 101 is coupled to the first terminals T1 of the first insulating substrate 10, for example, with a film-on-glass (FOG) method using an anisotropic conductive film (ACF) (hereinafter, called "FOG mounting"). This configuration electrically couples wiring lines of the first insulating substrate 10 to respective wiring lines on the wiring substrate 101.

The wiring substrate 101 is provided with a driver integrated circuit (IC) 110. The driver IC 110 includes, for example, a control circuit for controlling display of the display device 1, a detection circuit, and an analog front end. The driver IC 110 is mounted on the wiring substrate 101 with a chip-on-film (COF) method using an ACF (hereinafter, called "COF mounting"). The mounting method of the driver IC 110 is not limited to this example, and a chip-on-glass (COG) mounting method may be used to mount the driver IC 110 on the first insulating substrate 10. In this case, the driver IC 110 is provided between the first terminals T1 coupled to the wiring substrate 101 and a signal-line coupling circuit 30 (refer to FIG. 5). The arrangement of the driver IC 110 is not limited to the above-described examples. The driver IC 110 may be provided on, for example, a control substrate or a flexible substrate outside the module.

As described above, the first terminals T1 are terminals electrically coupled to the driver IC 110. The second terminals T2 are terminals for panel inspection, to which an inspection device 200 (refer to FIG. 6) is coupled and signals for inspection (inspection signals TSIG) are supplied at the time of the inspection.

As illustrated in FIGS. 2 and 3, the counter substrate SUB2 is disposed so as to face the surface of the array substrate SUB1 in a direction orthogonal thereto. A liquid crystal layer LC is provided between the array substrate SUB1 and the counter substrate SUB2.

In FIG. 3, the array substrate SUB1 includes the light-transmitting first insulating substrate 10, such as a glass substrate or a resin substrate, as a base. The array substrate SUB1 is provided, on a side of the first insulating substrate 10 facing the counter substrate SUB2, with, for example, a first insulating film 11, a second insulating film 12, a third insulating film 13, a fourth insulating film 14, a fifth insulating film 15, a sixth insulating film 16, signal lines SL, pixel electrodes PE, detection electrodes DE, and a first orientation film AL1.

In this specification, in a direction orthogonal to the first insulating substrate 10, a direction from the first insulating substrate 10 toward the second insulating substrate 20 is referred to as an "upper side direction" or simply an "upper side", and a direction from the second insulating substrate 20 toward the first insulating substrate 10 is referred to as a "lower side direction" or simply a "lower side". The term "plan view" refers to a case of viewing from the direction orthogonal to the first insulating substrate 10.

The first insulating film 11 is located on the upper side of the first insulating substrate 10. The second insulating film 12 is located on the upper side of the first insulating film 11. The third insulating film 13 is located on the upper side of the second insulating film 12. The signal lines SL are located on the upper side of the third insulating film 13. The fourth insulating film 14 is located on the upper side of the third insulating film 13 and covers the signal lines SL.

Sensor wiring lines 51 are located on the upper side of the fourth insulating film 14. The sensor wiring lines 51 faces the signal lines SL with the fourth insulating film 14 interposed therebetween. In other words, the sensor wiring lines 51 are laid over the signal lines SL. The sensor wiring lines 51 are covered with the fifth insulating film 15. The first insulating film 11, the second insulating film 12, the third insulating film 13, and the sixth insulating film 16 are each made of, for example, a light-transmitting inorganic material, such as a silicon oxide or a silicon nitride. The fourth insulating film 14 and the fifth insulating film 15 are each made of a light-transmitting resin material, and have each a film thickness greater than that of the other insulating films each made of an inorganic material. However, the fifth insulating film 15 may be made of an inorganic material.

The detection electrodes DE are located on the upper side of the fifth insulating film 15. The detection electrodes DE face the sensor wiring lines 51 with the fifth insulating film 15 interposed therebetween. Slits SPA of the detection electrodes DE are vertically located on the upper side of the sensor wiring lines 51. The detection electrodes DE are covered with the sixth insulating film 16. The sixth insulating film 16 is made of, for example, a light-transmitting inorganic material, such as a silicon oxide or a silicon nitride.

The pixel electrodes PE are located on the upper side of the sixth insulating film 16 and face the detection electrodes DE with the sixth insulating film 16 interposed therebetween. The pixel electrodes PE and the detection electrodes DE are each made of, for example, a light-transmitting conductive material, such as indium tin oxide (ITO) or indium zinc oxide (IZO). The pixel electrodes PE are covered with the first orientation film AL1. The first orientation film AL1 also covers the sixth insulating film 16.

The counter substrate SUB2 includes the light-transmitting second insulating substrate 20, such as a glass substrate or a resin substrate, as a base. The counter substrate SUB2 is provided, on a side of the second insulating substrate 20 facing the array substrate SUB1, with, for example, a light-shielding layer BM, color filters CFR, CFG, and CFB, an overcoat layer OC, and a second orientation film AL2. The counter substrate SUB2 is provided, on a side of the second insulating substrate 20 opposite to a side thereof facing the array substrate SUB1, with a conductive layer 21.

The light-shielding layer BM is located on the side of the second insulating substrate 20 facing the array substrate SUB1. The light-shielding layer BM defines opening portions facing the pixel electrodes PE. The light-shielding layer BM is made of a black resin material or a light-shielding metal material.

Each of the color filters CFR, CFG, and CFB is located on the side of the second insulating substrate 20 facing the array substrate SUB1, and overlaps, at ends thereof, the light-shielding layer BM. In one example, the color filters CFR, CFG, and CFB are made of a resin material colored in red, green, and blue, respectively.

The overcoat layer OC covers the color filters CFR, CFG, and CFB. The overcoat layer OC is made of a light-transmitting resin material. The second orientation film AL2 covers the overcoat layer OC. The first orientation film AL1 and the second orientation film AL2 are made of, for example, a material that exhibits a horizontal orientation property.

The array substrate SUB1 and the counter substrate SUB2 are disposed such that the first orientation film AL1 and the second orientation film AL2 face each other. The liquid crystal layer LC is interposed between the first orientation film AL1 and the second orientation film AL2. The liquid crystal layer LC includes a negative liquid crystal material having a negative dielectric anisotropy or a positive liquid crystal material having a positive dielectric anisotropy.

The array substrate SUB1 faces a backlight IL, and the counter substrate SUB2 is located on a display surface side. The backlight IL may have any structure, and the detailed structure thereof will not be described.

The conductive layer 21 is provided on the upper side of the second insulating substrate 20. The conductive layer 21 is, for example, a light-transmitting conductive material, such as ITO. Externally applied static electricity and static electricity charged in a polarizing plate PL2 flow in the conductive layer 21. The display device 1 can remove the static electricity in a short time, and can reduce the static electricity applied to the liquid crystal layer LC serving as a display layer. Thus, the display device 1 can improve electrostatic discharge (ESD) resistance.

Optical elements including a polarizing plate PL1 are disposed on an outer surface, or a surface facing the backlight IL, of the first insulating substrate 10. Optical elements including the polarizing plate PL2 are disposed on an outer surface, or a surface on an observation position side, of the second insulating substrate 20. A first polarization axis of the polarizing plate PL1 and a second polarization axis of the polarizing plate PL2 are in a positional relation of, for example, crossed Nicols in an xy-plane. The optical elements including the polarizing plate PL1 and the optical elements including the polarizing plate PL2 may include other optical functional elements, such as a retardation film.

For example, in the case where the liquid crystal layer LC is a negative liquid crystal material, when no voltage is applied to the liquid crystal layer LC, a long axis of a liquid crystal molecule LM is initially oriented in a direction along the first direction Dx in an xy-plane. When a voltage is applied to the liquid crystal layer LC, that is, in an on-state in which an electric field is formed between the pixel electrodes PE and the detection electrodes DE, the orientation state of the liquid crystal molecule LM changes under the influence of the electric field. During the on-state, the polarization state of incident linearly polarized light changes with the orientation state of the liquid crystal molecule LM when the light passes through the liquid crystal layer LC.

Figure 4:
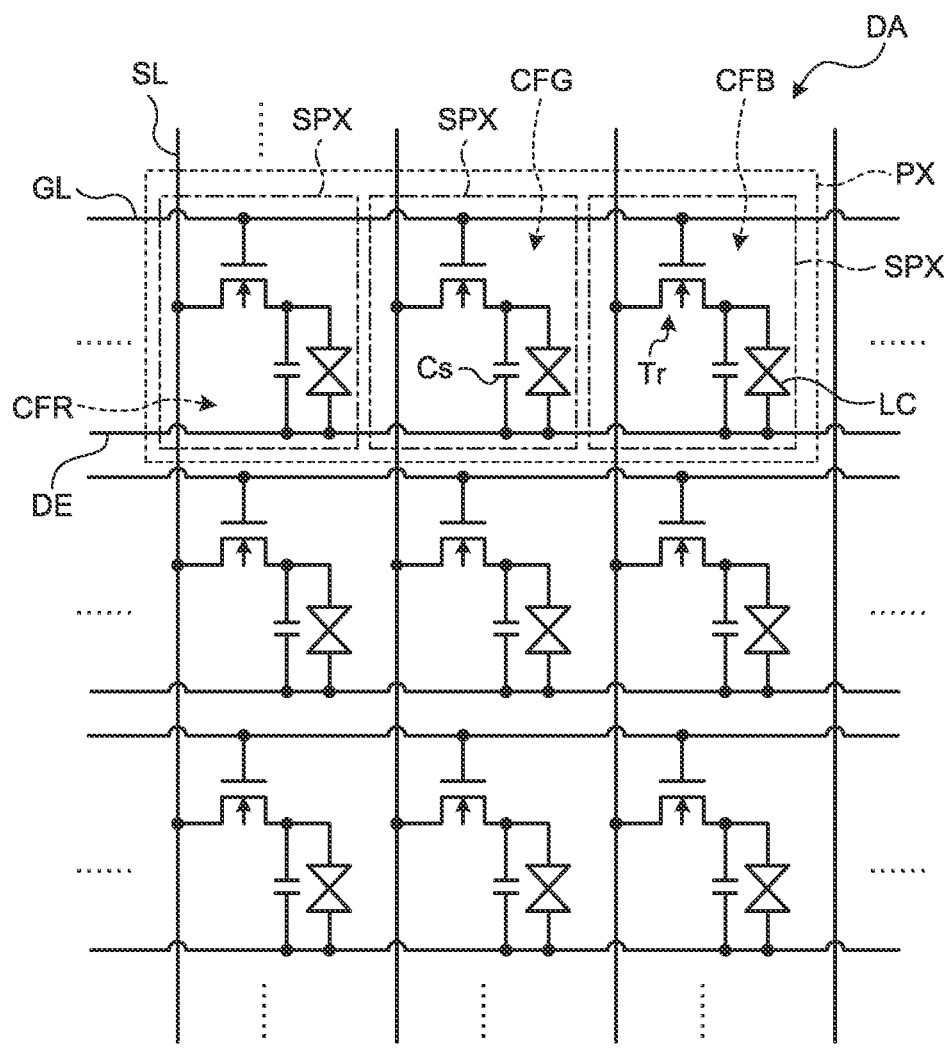
FIG. 4 is a circuit diagram illustrating a pixel array in a display region.

FIG. 4 is a circuit diagram illustrating a pixel array in the display region. The array substrate SUB1 is provided with, for example, switching elements Tr of respective sub-pixels SPX, the signal lines SL, and scan lines GL, which are illustrated in FIG. 4. The signal lines SL are wiring lines for supplying pixel signals to the pixel electrodes PE (refer to FIG. 3). The scan lines GL are wiring lines for supplying a gate signal for driving each of the switching elements Tr.

Each of the pixels PX includes the sub-pixels SPX. Each of the sub-pixels SPX includes a corresponding one of the switching elements Tr and a storage capacitor Cs for the liquid crystal layer LC. The switching element Tr is fabricated from a thin-film transistor, and in this example, fabricated from an n-channel metal oxide semiconductor (MOS) thin-film transistor (TFT). The sixth insulating film 16 is provided between the pixel electrodes PE and the detection electrodes DE illustrated in FIG. 3, and these components provide the storage capacitors Cs illustrated in FIG. 4.

As the color filters CFR, CFG, and CFB illustrated in FIG. 3, for example, color regions colored in three colors of red (R), green (G), and blue (B) are periodically arranged. The color regions of the three colors of R, G, and B are associated, as one set, with each set of the sub-pixels SPX. The sub-pixels SPX corresponding to the color regions of the three colors constitute, as one set, the pixel PX. The color filters may include color regions of four or more colors. In this case, the pixel PX may include four or more sub-pixels SPX.

Figure 5:
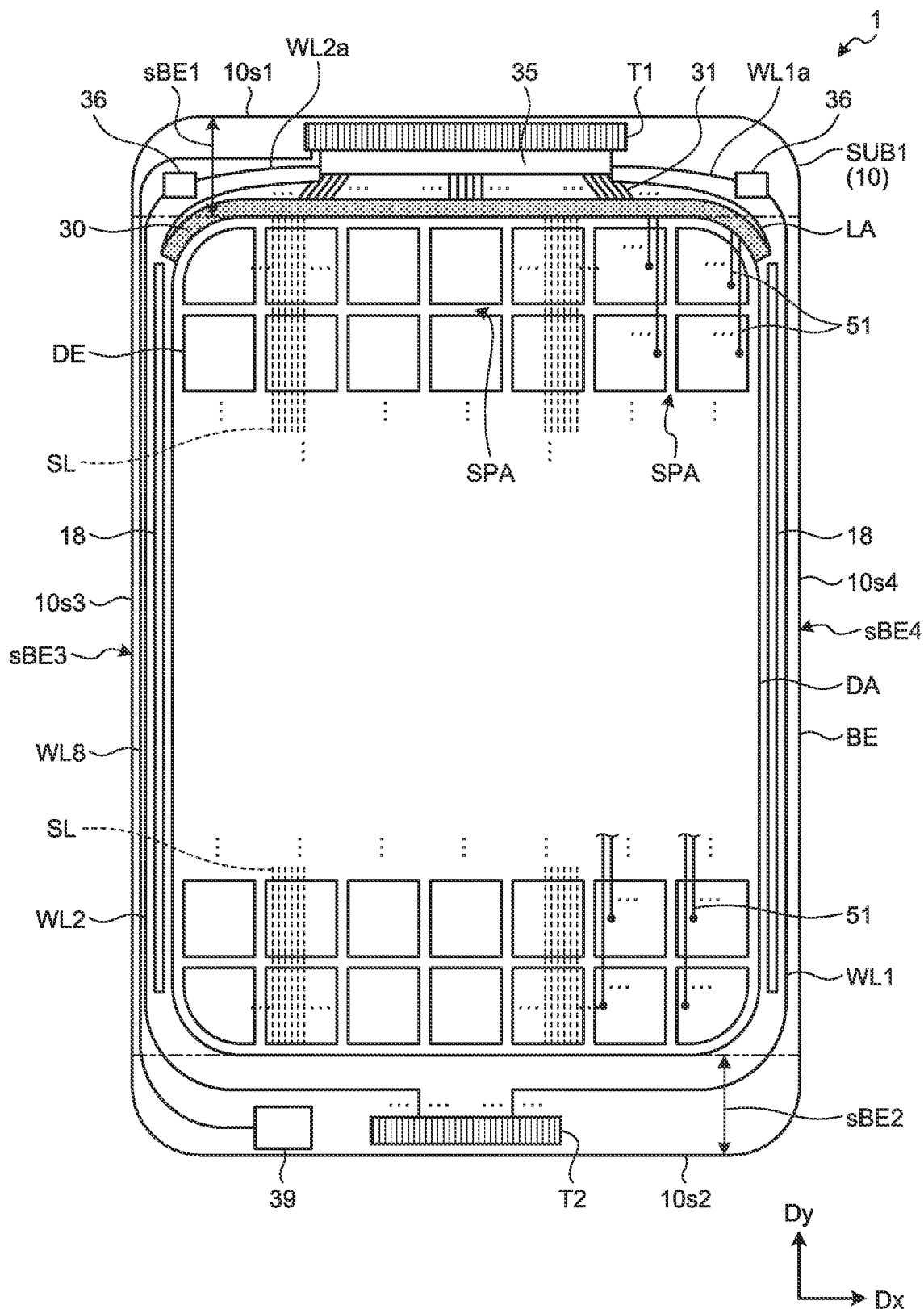
FIG. 5 is a plan view schematically illustrating an array substrate.

FIG. 5 is a plan view schematically illustrating the array substrate. The display region DA for displaying the image includes a sensor region included in a detection device for detecting an electrostatic capacity. As illustrated in FIG. 5, the detection electrodes DE are arranged in the first direction Dx and the second direction Dy to be formed in a matrix having a row-column configuration in the display region DA. The detection electrodes DE are divided by the slits SPA in the first direction Dx and the second direction Dy. Each of the detection electrodes DE is schematically illustrated in a rectangular shape or a square shape in the plan view, but is not limited to these shapes, and may have a polygonal shape, a parallelogram shape, or a non-ordinary shape provided with, for example, a notch. The detection electrodes DE are made of, for example, a light-transmitting conductive material, such as ITO.

The display device 1 further includes the signal-line coupling circuit 30, a wiring region LA provided with a plurality of coupling wiring lines 31, a first coupling circuit 35, second coupling circuits 36, and a ground (GND) electrode 39. The signal-line coupling circuit 30, the wiring region LA provided with the coupling wiring lines 31, the first coupling circuit 35, and the second coupling circuits 36 are provided in the first partial peripheral region sBE1 of the first insulating substrate 10. The first terminals T1, the first coupling circuit 35, the coupling wiring lines 31, the signal-line coupling circuit 30, and the signal lines SL are coupled in this order from the first side 10s1 toward the display region DA. The GND electrode 39 is provided in the second partial peripheral region sBE2.

Each of the sensor wiring lines 51 is electrically coupled to a corresponding one of the detection electrodes DE, and is lead out to the peripheral region BE. The sensor wiring lines 51 extend along the second direction Dy and are arranged in the first direction Dx. One end of each sensor wiring line 51 is coupled to the corresponding detection electrode DE, and the other end thereof is electrically coupled to the first coupling circuit 35. Specifically, the other ends of the sensor wiring lines 51 are coupled to the first terminals T1 through the signal-line coupling circuit 30, the coupling wiring lines 31, and the first coupling circuit 35. In this way, the detection electrodes DE are electrically coupled to the driver IC 110 (refer to FIG. 1).

The pixel electrodes PE (refer to FIG. 3) are electrically coupled to the driver IC 110 through the signal lines SL and the signal-line coupling circuit 30. The signal lines SL are electrically coupled to the pixel electrodes PE arranged in the first direction Dx, and is lead out to the peripheral region BE. The signal lines SL extend along the second direction Dy and are arranged in the first direction Dx. For viewability purposes, FIG. 5 illustrates only some of the signal lines SL and some of the sensor wiring lines 51.

The signal-line coupling circuit 30 is provided along a boundary between the display region DA and the first partial peripheral region sBE1, and is also provided along curved portions of the display region DA. The signal lines SL and the sensor wiring lines 51 are coupled to the signal-line coupling circuit 30. The signal-line coupling circuit 30 is electrically coupled to the wiring substrate 101 (refer to FIG. 1) through the coupling wiring lines 31 in the wiring region LA, the first coupling circuit 35, and the first terminals T1. The signal-line coupling circuit 30 switches between coupling and decoupling the signal lines SL and the coupling wiring lines 31. The signal-line coupling circuit 30 also switches between coupling and decoupling the sensor wiring lines 51 and the coupling wiring lines 31.

The first coupling circuit 35 is provided between the first terminals T1 and the display region DA in the first partial peripheral region sBE1. The first coupling circuit 35 is provided between the first terminals T1 and both the coupling wiring lines 31 and signal-line coupling circuit 30, and is coupled to the signal lines SL through the coupling wiring lines 31 and the signal-line coupling circuit 30. The first coupling circuit 35 is a circuit that switches between coupling and decoupling the signal lines SL and the second terminals T2.

The first coupling circuit 35 is coupled to the second terminals T2 through first wiring lines WL1a, one of the second coupling circuits 36, and first wiring lines WL1. The first wiring lines WL1 are provided in the fourth partial peripheral region sBE4 and extend in the second direction Dy through a gap between one of gate scanner circuits 18 and the fourth side 10s4. The gate scanner circuits 18 sequentially selects each of the scan lines GL (refer to FIG. 4), and supplies the gate signal to the selected scan line GL. The first coupling circuit 35 is coupled to the second terminals T2 through second wiring lines WL2a, the other of the second coupling circuits 36, and second wiring lines WL2. The second wiring lines WL2 are provided in the third partial peripheral region sBE3 and extend in the second direction Dy through a gap between the other of the gate scanner circuits 18 and the third side 10s3. In this way, the first wiring lines WL1 and the second wiring lines WL2 are provided outside the gate scanner circuits 18. This arrangement can reduce interference of the first wiring lines WL1 and the second wiring lines WL2 with a plurality of transfer circuits constituting the gate scanner circuits 18 and with the scan lines GL.

Each second coupling circuit 36 is provided in the first partial peripheral region sBE1 and switches between coupling and decoupling the first coupling circuit 35 and the second terminals T2. The second coupling circuits 36 also couple the first wiring lines WL1 and the second wiring lines WL2 to third wiring lines WL3 (refer to FIG. 6) at the time of the display. The first wiring lines WL1 and the second wiring lines WL2 are inspection-signal supply wiring lines that supply the inspection signals TSIG to the signal lines SL. Each of the third wiring lines WL3 is a wiring line that supplies a ground potential to the first wiring lines WL1 and the second wiring lines WL2. Alternatively, each of the third wiring lines WL3 is a guard-signal supply wiring line that supplies a guard signal (to be described later) to the first wiring lines WL1 and the second wiring lines WL2. In this embodiment, the number of the third wiring lines is two, but is not limited thereto. The number of the third wiring lines may be one or more than two.

As illustrated in FIG. 5, the GND electrode 39 is provided in the second partial peripheral region sBE2 and is coupled to the first terminals T1 through eighth wiring WL8. The GND electrode 39 is electrically coupled to the conductive layer 21 (refer to FIG. 3) and supplies the ground potential to the conductive layer 21. A known method can be applied as a method for coupling the conductive layer 21 to the GND electrode 39. For example, the conductive layer 21 may be coupled to the GND electrode 39 through conductive paste provided in a through-hole formed in the second insulating substrate 20, or the conductive layer 21 may be coupled to the GND electrode 39 through a conductor such as the conductive paste provided along a side surface of the second insulating substrate 20.

Figure 6:
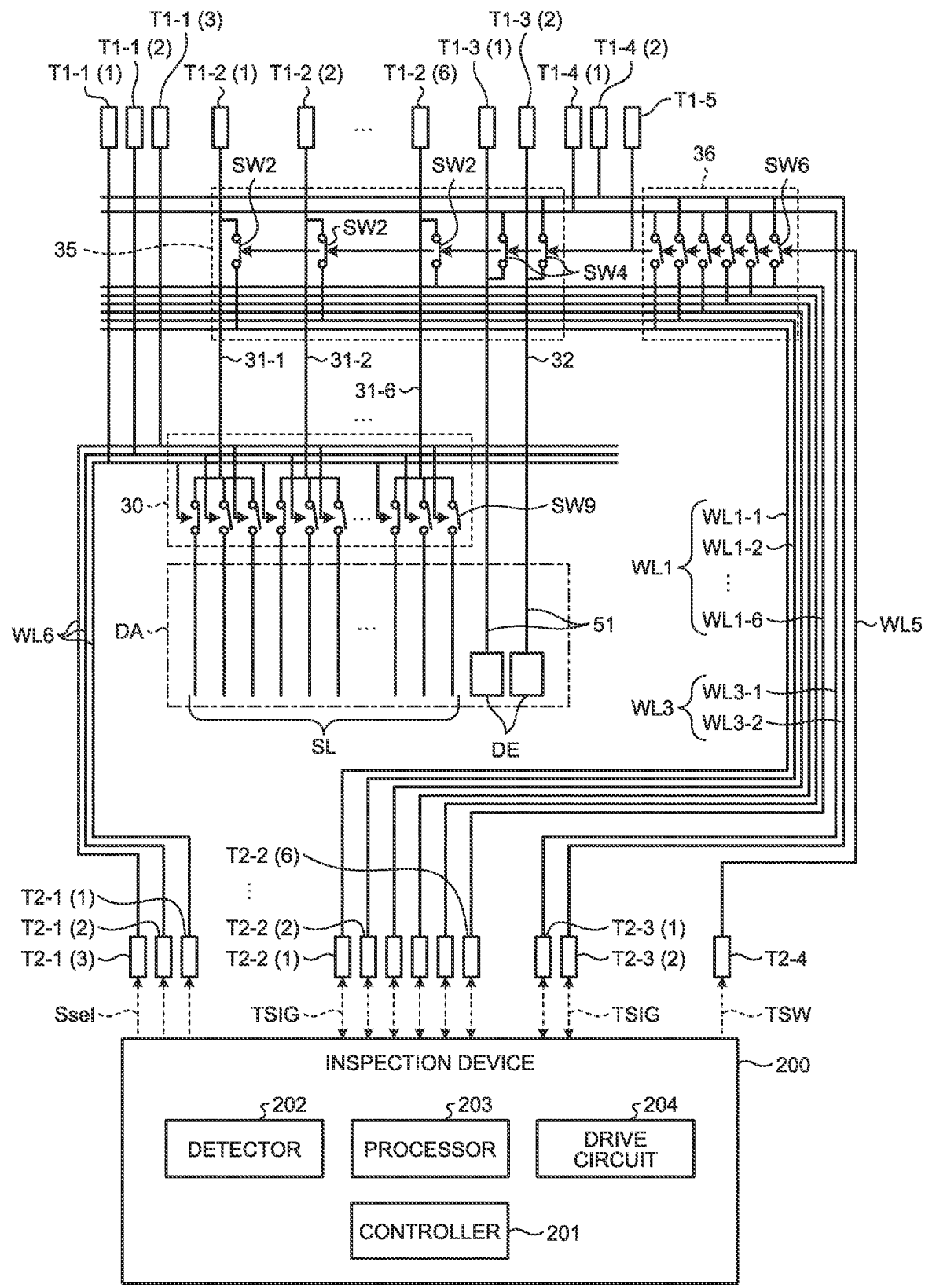
FIG. 6 is a circuit diagram illustrating first terminals, second terminals, a first coupling circuit, and a second coupling circuit according to the first embodiment.

FIG. 6 is a circuit diagram illustrating the first terminals, the second terminals, the first coupling circuit, and the second coupling circuit according to the first embodiment. For ease of understanding of the description, FIG. 6 illustrates a plurality of first terminals T1-1, T1-2, T1-3, T1-4, and T1-5 and a plurality of second terminals T2-1, T2-2, T2-3, and T2-4. These terminals are simply referred to as the first terminals T1 and the second terminals T2 when need not be distinguished from one another. While FIG. 6 does not illustrate the second wiring lines WL2 (refer to FIG. 5), description of the first wiring lines WL1 can also be applied to the second wiring lines WL2. As illustrated in FIG. 6, the inspection device 200 is coupled to the second terminals T2 at the time of the inspection. The inspection device 200 includes a controller 201, a detector 202, a processor 203, and a drive circuit 204. This configuration of the inspection device 200 is merely an example, and the inspection device 200 may lack some of these functions or may have other functions. The driver IC 110 (refer to FIG. 1) may have some of the functions of the inspection device 200.

The controller 201 is a circuit that controls the detector 202, the processor 203, and the drive circuit 204 to inspect the display device 1. The detector 202 is a circuit that detects signals output from the signal lines SL and the sensor wiring lines 51. The detector 202 is, for example, a voltage detection circuit or a current detection circuit. The processor 203 is a determination circuit that determines whether or not, for example, a short circuit and/or a disconnection are/is occurring in the signal lines SL and the sensor wiring lines 51 based on detection signals of the detector 202. The drive circuit 204 generates various signals, such as an inspection control signal TSW and the inspection signals TSIG, and outputs the generated signals to the display device 1.

The first coupling circuit 35 includes the first wiring lines WL1, the third wiring lines WL3, and a plurality of switches SW2 and SW4. A plurality of first wiring lines WL1-1, WL1-2, . . . , and WL1-6 of the first wiring lines WL1 supply the inspection signals TSIG to the signal lines SL. First ends of the first wiring lines WL1-1, WL1-2, . . . , and WL1-6 are coupled to second terminals T2-2(1), T2-2(2), . . . , and T2-2(6), respectively. The switches SW2 are provided for the respective first wiring lines WL1-1, WL1-2, . . . , and WL1-6, and switch between coupling and decoupling the first wiring lines WL1-1, WL1-2, . . . , and WL1-6 and a plurality of coupling wiring lines 31-1, 31-2, . . . , and 31-6 of the coupling wiring lines 31. First ends of a plurality of third wiring lines WL3-1 and WL3-2 of the third wiring lines WL3 are coupled to second terminals T2-3(1) and T2-3(2), respectively. Second ends of the third wiring lines WL3-1 and WL3-2 are coupled to first terminals T1-4(1) and T1-4(2), respectively. The switches SW4 are provided for the respective third wiring lines WL3-1 and WL3-2, and switch between coupling and decoupling the third wiring lines WL3-1 and WL3-2 and a plurality of coupling wiring lines 32.

First ends of the coupling wiring lines 31-1, 31-2, . . . , and 31-6 are coupled to the first terminals T1-2(1), T1-2(2), . . . , and T1-2(6), respectively. Second ends of the coupling wiring lines 31-1, 31-2, . . . , and 31-6 are coupled to the signal lines SL through switches SW9 of the signal-line coupling circuit 30. In the signal-line coupling circuit 30, the switches SW9 are provided for the respective signal lines SL, and multiple ones of the switches SW9, which are respectively coupled to multiple ones of the signal lines SL, are coupled to one of the coupling wiring lines 31. The signal-line coupling circuit 30 couples, for each coupling wiring line 31, at least one signal line SL selected from the signal lines SL to the coupling wiring line 31 at a time. In FIG. 6, three of the switches SW9 are coupled to one of the coupling wiring lines 31, and three of the signal lines SL are coupled to the three of the switches SW9, respectively. The coupling configuration is not limited to this configuration. Four or more of the switches SW9 may be coupled to one of the coupling wiring lines 31, and four or more of the signal lines SL may be coupled to the four or more of the switches SW9, respectively.

A plurality of sixth wiring lines WL6 supply selection signals Ssel to the switches SW9. The sixth wiring lines WL6 are provided corresponding to the switches SW9 and the signal lines SL coupled to one of the coupling wiring lines 31. In other words, the number of the sixth wiring lines WL6 is equal to the number of the switches SW9 coupled to one of the coupling wiring lines 31. First ends of the sixth wiring lines WL6 are coupled to second terminals T2-1(1), T2-1(2), and T2-1(3), respectively. The sixth wiring lines WL6 are also coupled to first terminals T1-1(1), T1-1(2), and T1-1(3), respectively.

First ends of the coupling wiring lines 32 are coupled to first terminals T1-3(1) and T1-3(2). Second ends of the coupling wiring lines 32 are coupled to the sensor wiring lines 51 in the display region DA. The coupling wiring lines 32 may be formed with wiring lines with which the sensor wiring lines 51 are formed. In this case, the coupling wiring lines 32 and the sensor wiring lines 51 are collectively referred to as the sensor wiring lines 51 in some cases.

Each second coupling circuit 36 includes a plurality of switches SW6. The switches SW6 switch between coupling and decoupling the first wiring lines WL1 and the third wiring lines WL3 (second terminals T2-3). The switches SW2 and the switches SW6 are switched between on and off based on the inspection control signal TSW supplied from the inspection device 200 through the second terminal T2-4 and a fifth wiring line WL5. The fifth wiring line WL5 is an inspection-control-signal supply wiring line that supplies the inspection control signal TSW to the first coupling circuit 35 and the second coupling circuits 36.

At the time of the display, the switches SW2 and SW4 are off based on a control signal from the driver IC 110, while the inspection device 200 is not coupled thereto. This operation decouples the signal lines SL from the second terminals T2, and couples the signal lines SL to the first terminals T1-2 through the signal-line coupling circuit 30 and the coupling wiring lines 31. The driver IC 110 supplies the selection signals Ssel through the first terminals T1-1 and the sixth wiring lines WL6 to the switches SW9. The signal-line coupling circuit 30 sequentially selects the signal lines SL based on the selection signals Ssel. This operation causes the driver IC 110 to supply video signals through the first terminals T1-2 and the coupling wiring lines 31 to the signal lines SL.

At the time of the display, the sensor wiring lines 51 are coupled to the first terminals T1-3 through the signal-line coupling circuit 30 and the coupling wiring lines 32. This coupling allows the driver IC 110 to supply display drive signals through the coupling wiring lines 32 to the sensor wiring lines 51. At the time of the display, the detection electrodes DE are supplied with the display drive signals, and serve as common electrodes for the pixel electrodes PE.

At the time of the display, the switches SW6 in the second coupling circuits 36 are on. As a result, the first wiring lines WL1 provided in the peripheral region BE are coupled to the third wiring lines WL3, and supplied with the GND potential through the first terminals T1-4.

At the time of touch detection, the driver IC 110 supplies touch drive signals for detection through the first terminals T1-3 to the detection electrodes DE. The driver IC 110 may supply the guard signals having the same waveforms as those of the touch drive signals and synchronized with the touch drive signals through the first terminals T1-4 to the third wiring lines WL3. This operation supplies the guard signals to the first wiring lines WL1 and the third wiring lines WL3, and can restrain capacity coupling between the various sets of wiring and the detection electrodes DE. In the touch detection operation, the detection signals depending on changes in capacitance of the detection electrodes DE are supplied through the coupling wiring lines 32 to the detection circuit of the driver IC 110. By this operation, the display device 1 can detect a detection target object contacting or proximate to the display surface for each of the detection electrodes DE.

At the time of the inspection, the switches SW2 and SW4 in the first coupling circuit 35 are on based on the inspection control signal TSW. As a result, the signal lines SL are coupled to the first wiring lines WL1 through the signal-line coupling circuit 30, the coupling wiring lines 31, and the switches SW2. The switches SW6 in the second coupling circuits 36 are off based on the inspection control signal TSW.

In the same way, the sensor wiring lines 51 are also coupled to the third wiring lines WL3 through the coupling wiring lines 32 and the switches SW4. The third wiring lines WL3-1 and WL3-2 also serve as the inspection-signal supply wiring lines that supply the inspection signals TSIG to the sensor wiring lines 51.

As illustrated in FIG. 6, the second terminals T2-1 supply the selection signals Ssel through the sixth wiring lines WL6 to the signal-line coupling circuit 30 at the time of the inspection. The second terminals T2-2 supply the inspection signals TSIG through the first wiring lines WL1 to the signal lines SL at the time of the inspection. The second terminals T2-3 supply the inspection signals TSIG through the third wiring lines WL3 to the sensor wiring lines 51 at the time of the inspection. The second terminal T2-4 supplies the inspection control signal TSW through the fifth wiring line WL5 to the first coupling circuit 35 and the second coupling circuits 36.

As described above, at the time of the inspection, the signal lines SL and the sensor wiring lines 51 are coupled to the second terminals T2. The display device 1 can inspect for, for example, the short circuit and the disconnection of the signal lines SL and the sensor wiring lines 51 based on the inspection signals TSIG supplied from the inspection device 200. The signal-line coupling circuit 30 is provided between the display region DA and the first coupling circuit 35, and is included in electrical feed paths for the inspection signals TSIG. With this configuration, the display device 1 can also inspect coupling of the signal-line coupling circuit 30.

Figure 7:
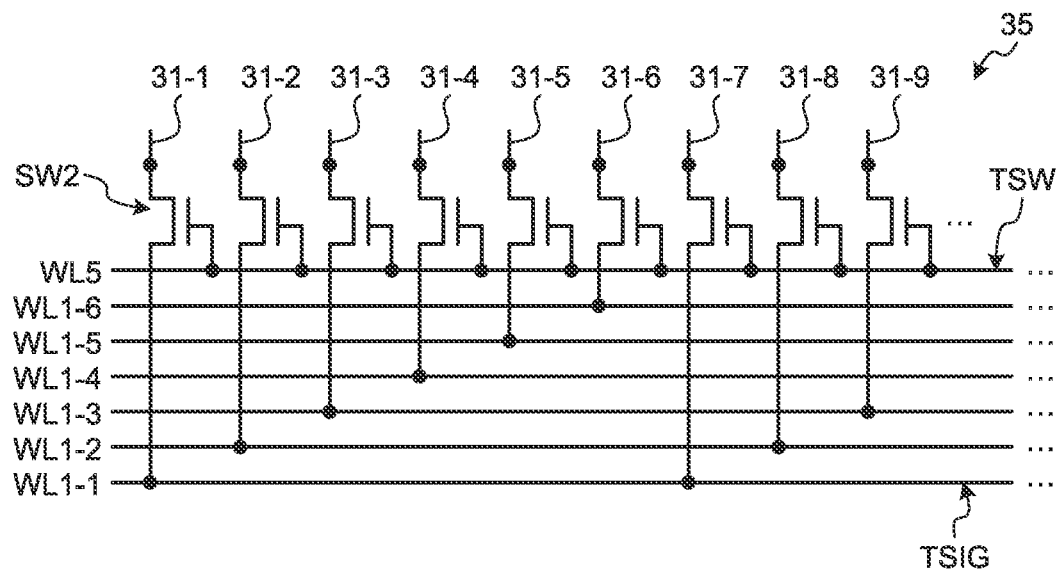
FIG. 7 is a circuit diagram illustrating the first coupling circuit.

FIG. 7 is a circuit diagram illustrating the first coupling circuit. As illustrated in FIG. 7, the coupling wiring lines 31-1, 31-2, . . . , and 31-9 are aligned. The switches SW2 are coupled to the coupling wiring lines 31-1, 31-2, . . . , and 31-9. The switches SW2 are fabricated from TFTs. The first wiring lines WL1-1, WL1-2, . . . , and WL1-6 and the fifth wiring line WL5 are aligned.

The fifth wiring line WL5 is coupled to the gates of the switches SW2. The switches SW2 coupled to the coupling wiring lines 31-1 to 31-6 are coupled to the first wiring lines WL1-1 to WL1-6, respectively. The switch SW2 coupled to the coupling wiring line 31-7 is coupled to the first wiring line WL1-1. The switch SW2 coupled to the coupling wiring line 31-8 is coupled to the first wiring line WL1-2. In this way, the coupling wiring lines 31 and the switches SW2 are repetitively arranged. Thus, the operations of the switches SW2 cause the first coupling circuit 35 to couple multiple ones of the coupling wiring lines 31 to one of the first wiring lines WL1. This configuration can cause the number of wiring lines, such as the first wiring lines WL1, provided in the peripheral region BE to be smaller than the number of the coupling wiring lines 31.

Figure 8:
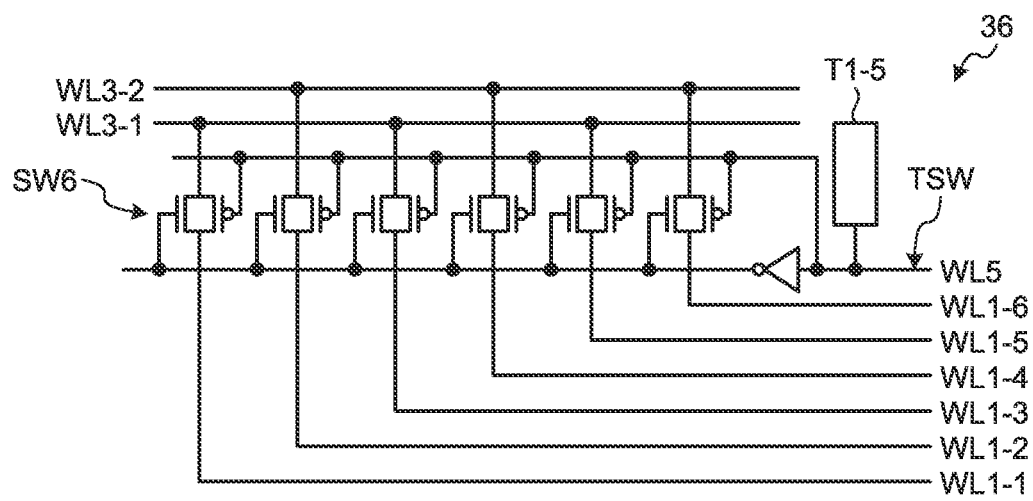
FIG. 8 is a circuit diagram illustrating the second coupling circuit.

FIG. 8 is a circuit diagram illustrating the second coupling circuit. As illustrated in FIG. 8, the switches SW6 are coupled to the respective first wiring lines WL1-1, WL1-2, . . . , and WL1-6. Each of the switches SW6 is fabricated from, for example, a complementary metal-oxide-semiconductor (CMOS) transistor obtained by combining a P-channel transistor with an N-channel transistor.

As described above, at the time of the inspection, the switches SW6 are supplied with the inspection control signal TSW through the fifth wiring line WL5, and the switches SW6 are off. At the time of the display, the driver IC 110 supplies a control signal VGL to each of the switches SW6 through the first terminal T1-5 and the fifth wiring line WL5. The control signal VGL is a low-level voltage signal having a lower potential than that of the inspection control signal TSW. The switches SW6 are on based on the control signal VGL. As a result, the first wiring lines WL1-1, WL1-3, and WL1-5 are coupled to the third wiring line WL3-1, and the first wiring lines WL1-2, WL1-4, and WL1-6 are coupled to the third wiring line WL3-2. The third wiring lines WL3-1 and WL3-2 are electrically coupled to the GND electrode 39 illustrated in FIG. 5.

As described above, the display device 1 includes the first insulating substrate 10 (first substrate), the display region DA, the peripheral region BE, the signal lines SL, the first terminals T1, the second terminals T2, and the first coupling circuit 35. The first insulating substrate 10 has the first side 10s1 and the second side 10s2 facing the first side 10s1. The display region DA is provided with the pixels PX. The peripheral region BE includes the first partial peripheral region sBE1 between the first side 10s1 of the first insulating substrate 10 and the display region DA, and includes the second partial peripheral region sBE2 between the second side 10s2 of the first insulating substrate 10 and the display region DA. The signal lines SL supply the signals to the switching elements Tr provided in the pixels PX. The first terminals T1 are provided in the first partial peripheral region sBE1, and are electrically coupled to the driver IC 110. The second terminals T2 are provided in the second partial peripheral region sBE2, and are supplied with the signals for inspection (inspection signals TSIG). The first coupling circuit 35 is provided between the first terminals T1 and the display region DA in the first partial peripheral region sBE1, and switches between coupling and decoupling the signal lines SL and the second terminals T2.

With this arrangement, the first terminals T1 and the second terminals T2 are provided in the first partial peripheral region sBE1 and the second partial peripheral region sBE2, respectively. As a result, even when a large number of the first terminals T1 are provided in the first partial peripheral region sBE1, which requires a large region for coupling the wiring substrate 101 to the first terminals T1, the second terminals T2 for inspection and the first coupling circuit 35, for example, can be efficiently disposed.

Second Embodiment

Figure 9:
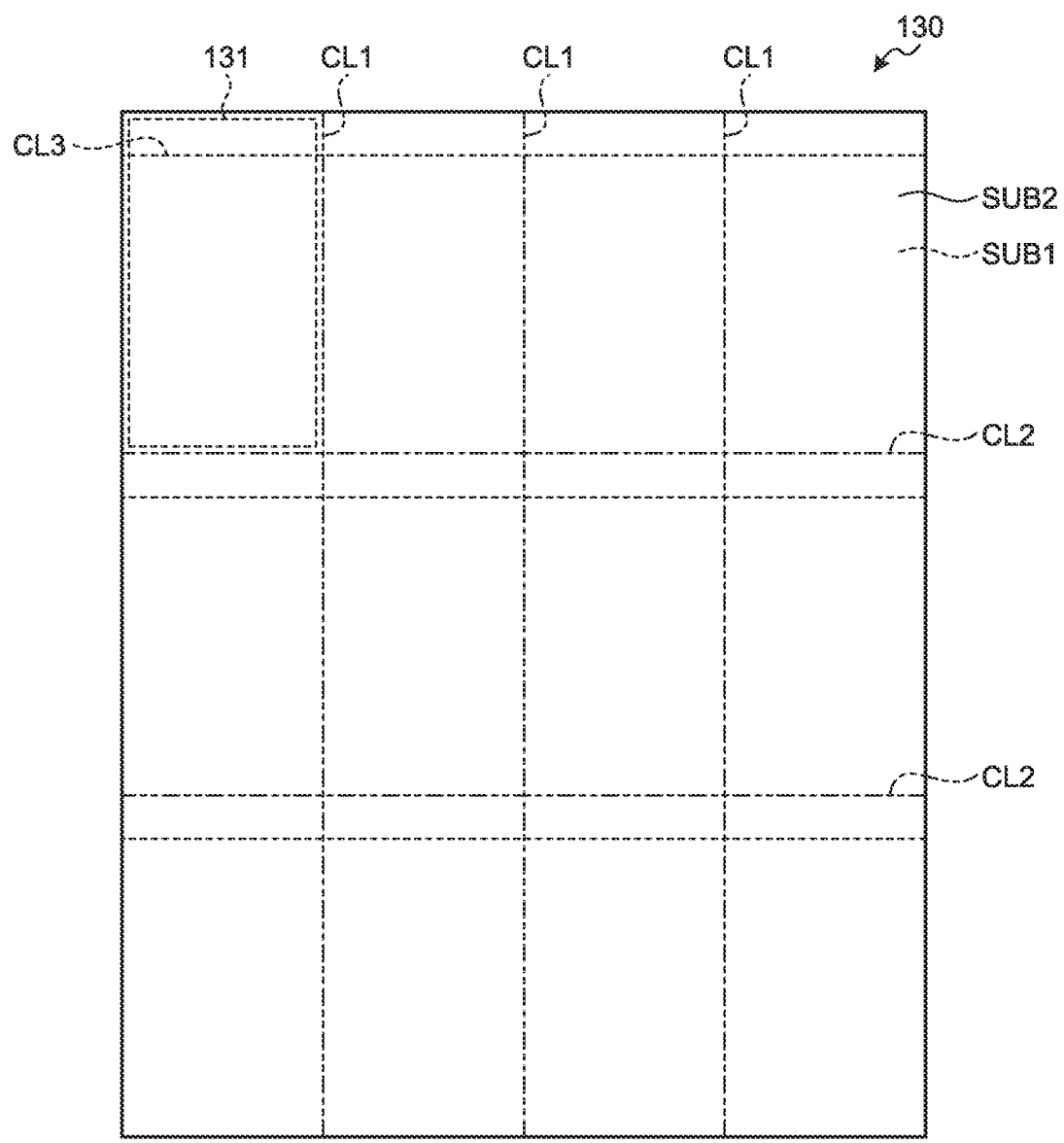
FIG. 9 is a plan view of a layered body according to a second embodiment of the present disclosure.
Figure 10:
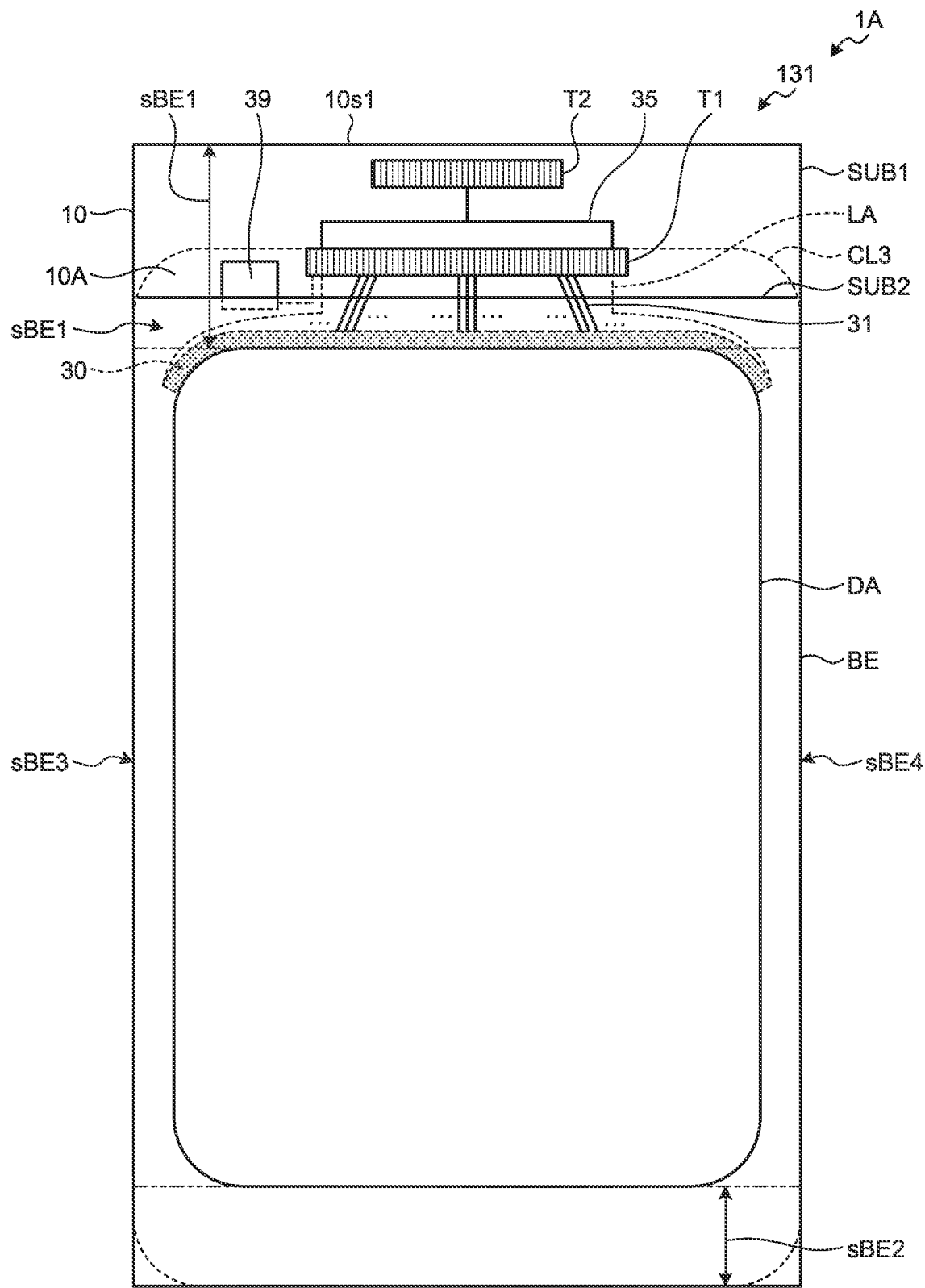
FIG. 10 is a plan view schematically illustrating a display device according to the second embodiment.
Figure 11:
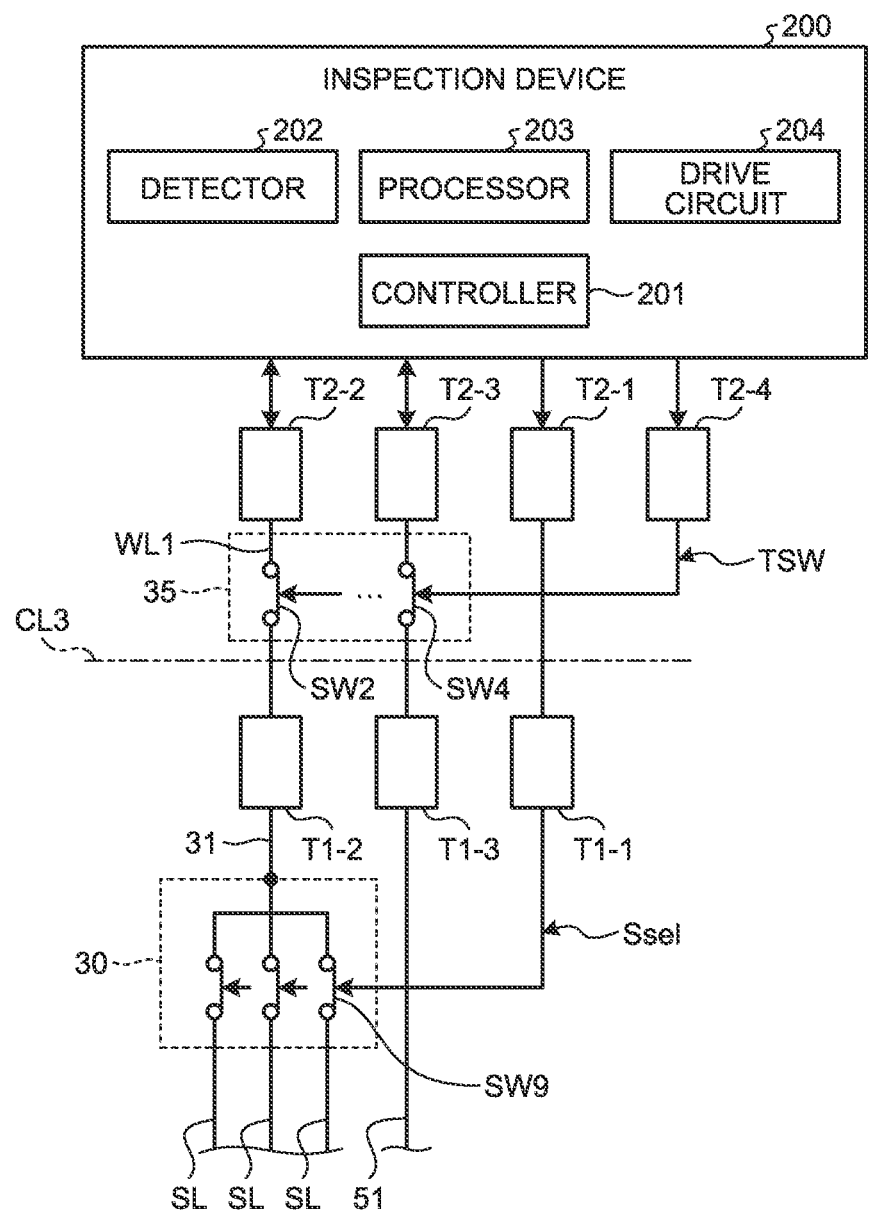
FIG. 11 is a circuit diagram illustrating the first terminals, the second terminals, and the first coupling circuit according to the second embodiment.

FIG. 9 is a plan view of a layered body according to a second embodiment of the present disclosure. FIG. 10 is a plan view schematically illustrating a display device according to the second embodiment. FIG. 11 is a circuit diagram illustrating the first terminals, the second terminals, and the first coupling circuit according to the second embodiment. In the following description, components described in the above embodiment are denoted by the same reference numerals or characters, and the description thereof will not be repeated in some cases.

A layered body 130 illustrated in FIG. 9 is a motherboard obtained by stacking the array substrate SUB1 and the counter substrate SUB2. An individual layered body 131 (substrates of the display device) is a portion cut from the layered body 130 along cutting lines CL1 and cutting lines CL2. A plurality of such individual layered bodies 131 can be cut out from one layered body 130. In FIG. 9, the layered body 130 includes 12 individual layered bodies 131. However, the number of the individual layered bodies 131 is not limited thereto, and the layered body 130 may include fewer than 12 individual layered bodies 131, or more than 12 individual layered bodies 131. Each of the individual layered bodies 131 is provided as a display device 1A.

As illustrated in FIG. 10, the first insulating substrate 10 has a rectangular shape in the plan view. A cutting line CL3 is an imaginary cutting line along which the first insulating substrate 10 is to be cut. The first extension portion 10A of the individual layered body 131 is obtained by cutting along the cutting line CL3 and removing, from the first partial peripheral region sBE1, a portion closer to the first side 10s1 than the cutting line CL3. As a result, the individual layered body 131 is provided as the display device 1A.

In this embodiment, the first terminals T1 are provided in the first partial peripheral region sBE1. The second terminals T2 are provided between the first side 10s1 and the first terminals T1. The first coupling circuit 35 is provided between the first terminals T1 and the second terminals T2. The GND electrode 39 is provided in the first partial peripheral region sBE1.

The first terminals T1 are provided between the cutting line CL3 and the display region DA. The second terminals T2 and the first coupling circuit 35 are provided between the cutting line CL3 and the first side 10s1. In other words, when the motherboard is shipped as the display device 1A, the second terminals T2 and the first coupling circuit 35 do not stay on the array substrate SUB1.

As a result, the display device 1A cut at the cutting line CL3 is not provided with the first coupling circuit 35 and the second coupling circuit 36, and thus the area of the first partial peripheral region sBE1 can be smaller than that of the first embodiment. The second partial peripheral region sBE2, the third partial peripheral region sBE3, and the fourth partial peripheral region sBE4 are also not provided with the various types of wiring, such as the first wiring lines WL1, the second wiring lines WL2, and the second terminals T2. Therefore, a narrower bezel than that of the first embodiment can be obtained. The display device 1A of this embodiment need not be provided with the second extension portion 10B, and thus, the width in the second direction Dy of the fourth partial peripheral region sBE4 can be reduced.

As illustrated in FIG. 11, the first coupling circuit 35 of this embodiment is a circuit that switches between coupling and decoupling the first terminals T1 and the second terminals T2. For ease of understanding of the description, FIG. 11 illustrates the first terminals T1-1, T1-2, and T1-3 and the second terminals T2-1, T2-2, and T2-3, one for each of the terminals. However, in the same way as FIG. 6, this embodiment also provides a plurality of terminals for each of the first terminals T1-1, T1-2, and T1-3 and a plurality of terminals for each of the second terminals T2-1, T2-2, and T2-3. The first coupling circuit 35 includes the switches SW2 and SW4. The switches SW2 switch between coupling and decoupling the first terminals T1-2 and the second terminals T2-2. The switches SW4 switch between coupling and decoupling the first terminals T1-3 and the second terminals T2-3. The first terminals T1-1 supply the selection signals Ssel to the signal-line coupling circuit 30. The second terminal T2-4 supplies the inspection control signal TSW to the first coupling circuit 35.

At the time of the inspection, the switches SW2 and SW4 of the first coupling circuit 35 are on based on the inspection control signal TSW. As a result, the first terminals T1 are coupled to the second terminals T2, and the inspection device 200 inspects the signal lines SL and the sensor wiring lines 51.

In this embodiment, the first terminals T1 and the second terminals T2 are provided in the same first partial peripheral region sBE1, and the first wiring lines WL1 are provided between the first terminals T1 and the second terminals T2. This arrangement can make the length of each first wiring line WL1 shorter than that of the first embodiment, and can simplify the configuration of the first coupling circuit 35. The first coupling circuit 35 can have the same configuration as that of FIG. 7. In other words, multiple ones of the coupling wiring lines 31, as one set, are coupled to one of the first wiring lines WL1, and thereby, the number of wiring lines of the first wiring lines WL1 and the number of the second terminals T2 can be reduced.

Third Embodiment

Figure 12:
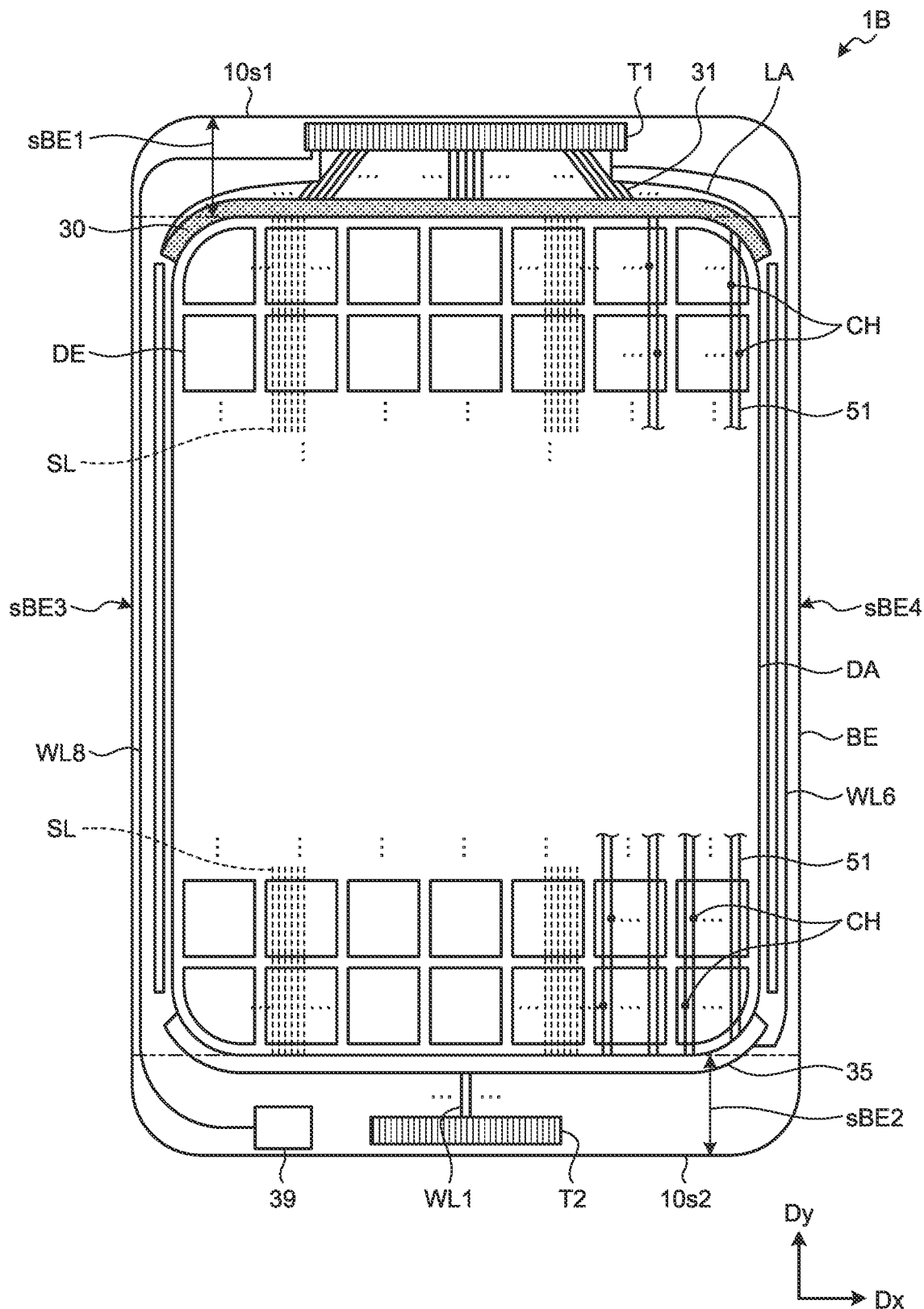
FIG. 12 is a plan view schematically illustrating an array substrate according to a third embodiment of the present disclosure.
Figure 13:
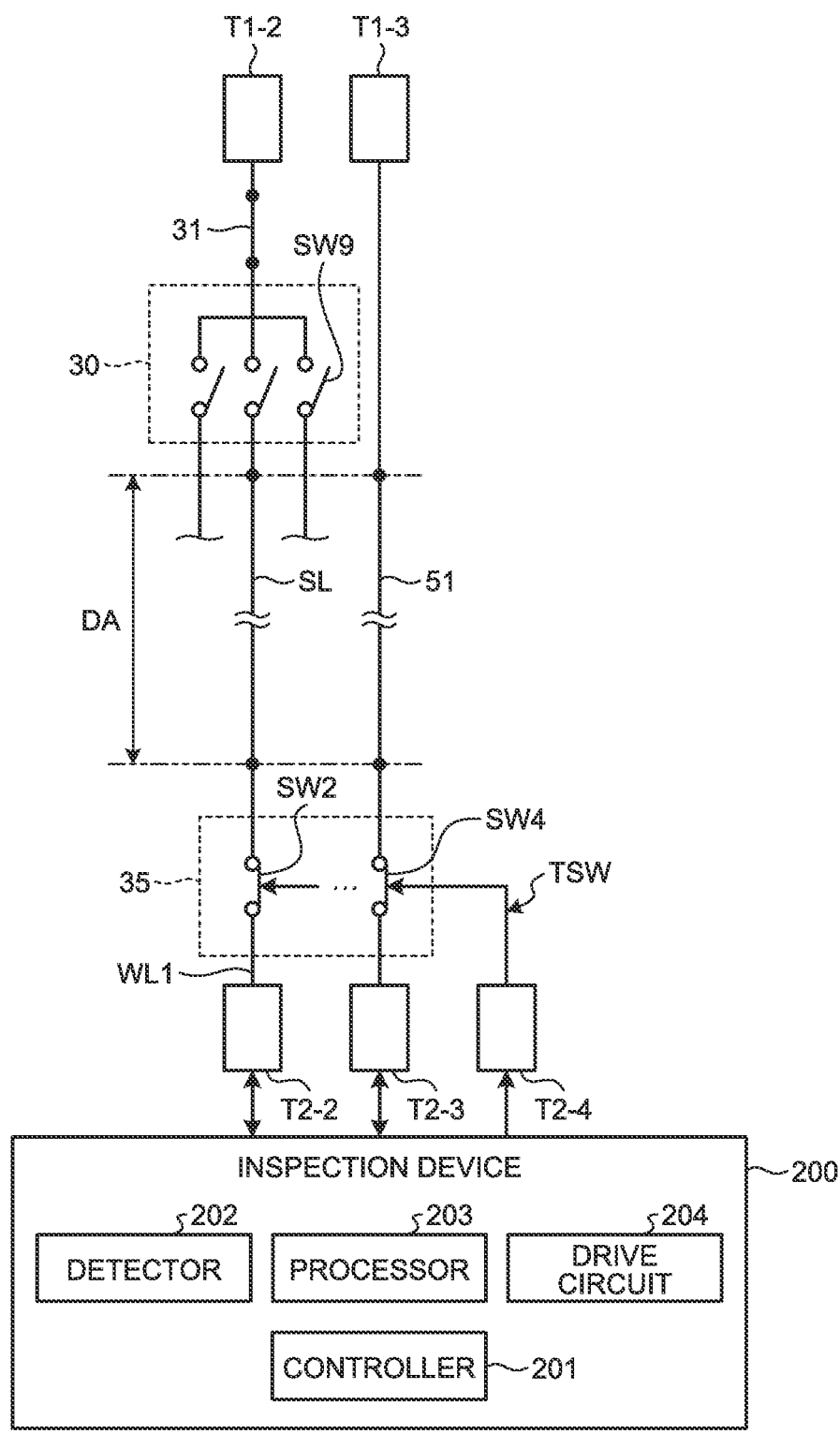
FIG. 13 is a circuit diagram illustrating the first terminals, the second terminals, and the first coupling circuit according to the third embodiment.

FIG. 12 is a plan view schematically illustrating an array substrate according to a third embodiment of the present disclosure. FIG. 13 is a circuit diagram illustrating the first terminals, the second terminals, and the first coupling circuit according to the third embodiment. In a display device 1B of this embodiment, the first coupling circuit 35 is provided in the second partial peripheral region sBE2. In the second partial peripheral region sBE2, the first coupling circuit 35 is provided between the second terminals T2 and the display region DA. The first coupling circuit 35 is a circuit that switches between coupling and decoupling the signal lines SL and the second terminals T2.

One end on the first side 10s1 side of each of the signal lines SL is coupled to the signal-line coupling circuit 30. The other end on the second side 10s2 side of each of the signal lines SL is coupled to the first coupling circuit 35. Each of the sensor wiring lines 51 is coupled, at one end, to the signal-line coupling circuit 30, and coupled to a corresponding one of the detection electrodes DE at a contact part CH thereof. Each of the sensor wiring lines 51 extends in the second direction Dy from the place coupled to the contact part CH toward the second side 10s2, and is coupled, at the other end, to the first coupling circuit 35.

In this embodiment, the first wiring lines WL1 for coupling the second terminals T2 to the first coupling circuit 35 are provided in the second partial peripheral region sBE2. This arrangement is advantageous for the display device 1B to reduce the width of the bezel at the third partial peripheral region sBE3 and the fourth partial peripheral region sBE4. Since the display device 1B does not include the second coupling circuit 36, the display device 1B has an advantage of reducing the width of the bezel at the first partial peripheral region sBE1.

As illustrated in FIG. 13, the first coupling circuit 35 includes the switches SW2 and SW4. For ease of understanding of the description, FIG. 13 does not illustrate the first terminals T1-1 and the second terminals T2-1. FIG. 13 also illustrates the first terminals T1-2 and T1-3 and the second terminals T2-2 and T2-3, one for each of the terminals. However, in the same way as FIG. 6, this embodiment also provides a plurality of terminals for each of the first terminals T1-1, T1-2, and T1-3 and a plurality of terminals for each of the second terminals T2-1, T2-2, and T2-3. The switches SW2 switch between coupling and decoupling the signal lines SL and the second terminals T2-2. In this embodiment, the first coupling circuit 35 is coupled to the signal lines SL without the signal-line coupling circuit 30. Therefore, the switches SW2 are provided one for each of the signal lines SL. In the same way as in the case of the signal-line coupling circuit 30, the first coupling circuit 35 may be configured such that multiple ones of the signal lines SL, as one set, are coupled to one switch SW2.

At the time of the inspection, the switches SW2 and SW4 of the first coupling circuit 35 are on based on the inspection control signal TSW. The second terminals T2-2 are coupled to the signal lines SL, and the second terminals T2-3 are coupled to sensor wiring lines 51. As a result, the inspection device 200 can inspect the signal lines SL and the sensor wiring lines 51. In this embodiment, the signal-line coupling circuit 30 and the coupling wiring lines 31 are not included in the electrical feed paths for the inspection signals TSIG.

Fourth Embodiment

Figure 14:
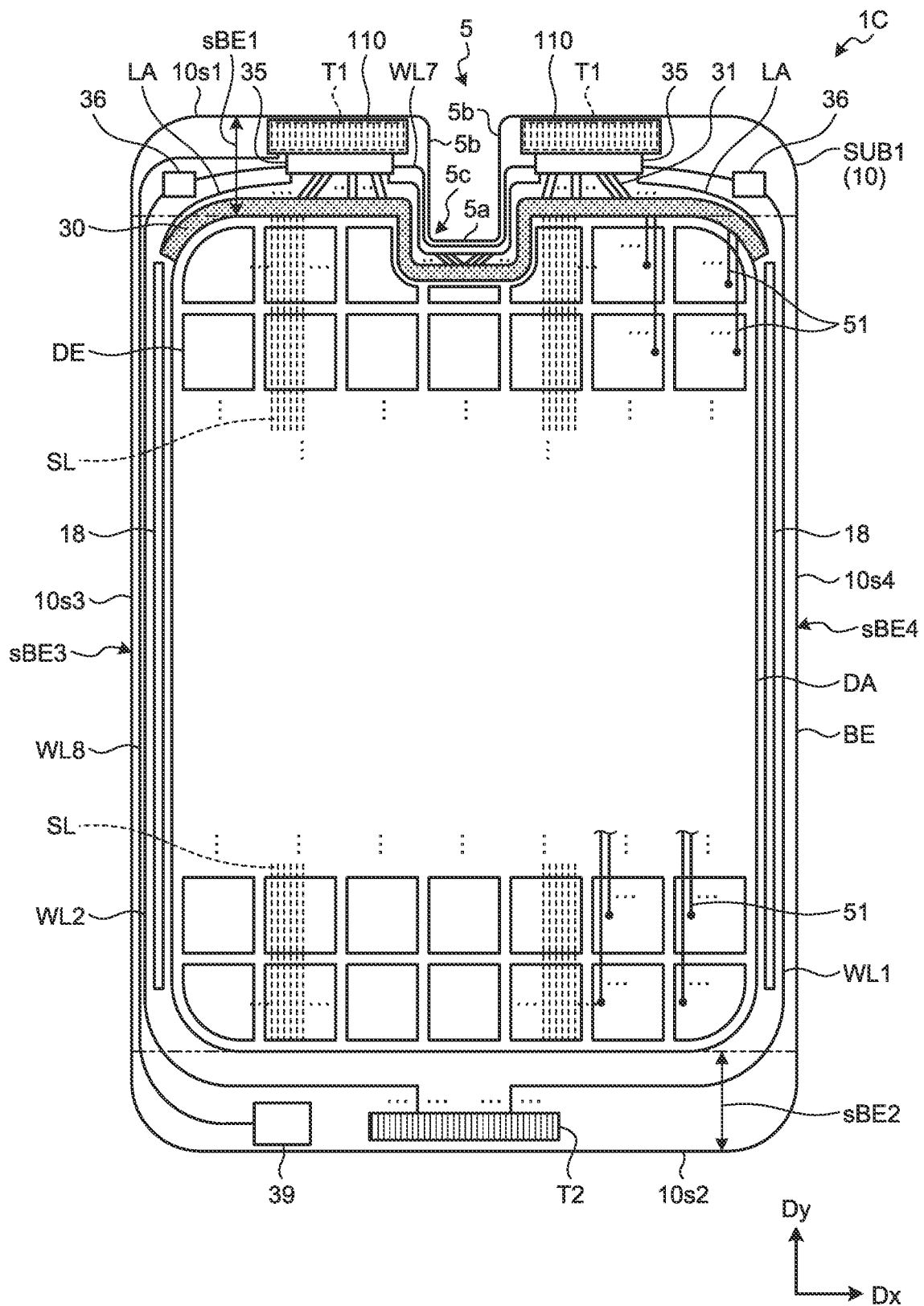
FIG. 14 is a plan view schematically illustrating an array substrate according to a fourth embodiment of the present disclosure.

FIG. 14 is a plan view schematically illustrating an array substrate according to a fourth embodiment of the present disclosure. In a display device 1C of this embodiment, the first insulating substrate 10 has a recess 5 recessed from the first side 10s1 toward the display region DA. The recess 5 is also called a notch. The recess 5 has a fifth side 5a, sixth sides 5b, and corners 5c. The fifth side 5a is parallel to the first direction Dx. The sixth sides 5b are parallel to the second direction Dy. The two sixth sides 5b are arranged in the first direction Dx. The corners 5c are portions coupling the fifth side 5a to the sixth sides 5b. The corners 5c form curves.

Some of the detection electrodes DE adjacent to the recess 5 have different shapes and sizes (areas) from those of the rectangular detection electrodes DE. Although not illustrated in FIG. 14, the counter substrate SUB2 (refer to FIG. 1) also has a non-ordinary shape that is not a rectangle in the plan view. For example, the outer circumference of the counter substrate SUB2 has corners including curves and a recess provided corresponding to the recess 5.

In this embodiment, in the same way as in the first embodiment, the first terminals T1, the first coupling circuits 35, the second coupling circuits 36, the wiring region LA, and the signal-line coupling circuit 30 are provided in the first partial peripheral region sBE1, and the second terminals T2 and the GND electrode 39 are provided in the second partial peripheral region sBE2. The fourth embodiment differs from the first, second, and third embodiments in that the driver ICs 110 are mounted on the first terminals T1, that is, a COG structure is employed. The configurations of, for example, the first coupling circuits 35 and the second coupling circuits 36, and the coupling of the first terminals T1 having the driver ICs 110 mounted thereon and the second terminals T2 to the first coupling circuits 35 and the second coupling circuits 36 are the same as those of the first embodiment. Thus, the detailed description thereof will not be repeated.

A plurality of sets of the first terminals T1 having the driver ICs 110 mounted thereon are arranged in the first direction Dx on both sides of the recess 5, and are provided along the first side 10s1 in portions not provided with the recess 5. In other words, two driver ICs 110 are provided so as to interpose the recess 5 therebetween. Two first coupling circuits 35 are arranged in the first direction Dx with the recess 5 interposed therebetween so as to correspond to the sets of the first terminals T1. The two first coupling circuits 35 are electrically coupled to each other by seventh wiring WL7 provided along the recess 5.

The wiring region LA and the signal-line coupling circuit 30 are provided along the recess 5. As a result, the signal-line coupling circuit 30 can couple to each other the signal lines SL and the coupling wiring lines 31 adjacent to the fifth side 5a of the recess 5. Such a configuration can efficiently dispose the circuits, such as the second terminals T2 for inspection and the first coupling circuits 35 even though the array substrate SUB1 has the recess 5.

The position provided with the recess 5 is not limited to the first side 10s1. The recess 5 may be formed on the second side 10s2. Also in the display devices 1A and 1B of the second and third embodiments, the recess 5 may be formed in the array substrate SUB1 in the same way as in this embodiment.

While exemplary embodiments according to the present disclosure have been described, the embodiments are not intended to limit the disclosure. The contents disclosed in the embodiments are given by way of example only, and various modifications may be made without departing from the spirit of the disclosure. Appropriate changes made without departing from the spirit of the disclosure naturally fall within the technical scope of the disclosure. At least one of various omissions, substitutions and changes can be made to the constituent elements without departing from the spirit of the present disclosure.

What is claimed is:

1. A display device comprising:
   a driver integrated circuit; and
   an array substrate,
   wherein the array substrate including:
      an insulating substrate having a first side and a second side opposed to the first side;
      pixels in a display region between the first side and the second side;
      detection electrodes arranged in a matrix in the display region;
      sensor wiring;
      a first insulating film between the detection electrodes and the sensor wiring;
      first terminals configured to be electrically coupled to the driver integrated circuit, and located between the display region and the first side;
      a second terminal; and
      a first coupling circuit between the second side and the display region,
   wherein
   a first sensor wiring line is one of lines included in the sensor wiring,
   a first detection electrode is one of the detection electrodes,
   the first sensor wiring line is connected to the first detection electrode via a contact part in the display region, and
   the first sensor wiring line is connected to a first thin film transistor of the first coupling circuit.

2. The display device of claim 1, wherein the first thin film transistor is configured to switch between coupling and decoupling the second terminal and the first sensor wiring line.

3. The display device of claim 2, wherein a signal for inspection is supplied to the first sensor wiring line from the second terminal.

4. The display device of claim 2, wherein the array substrate further comprising:
   a third terminal;
   a first connection line connected to the second terminal; and
   a second connection line connected to the third terminal, wherein
   a drain of the first thin film transistor is connected to the first sensor wiring line,
   a source of the first thin film transistor is connected to the first connection line, and
   a gate of the first thin film transistor is connected to the second connection line.

5. The display device of claim 4, wherein an inspection control signal is supplied to the gate of the first thin film transistor from the further second terminal.

6. The display device of claim 5, wherein the first insulating film and the second insulating film are made of a light-transmitting resin material.

7. The display device of claim 4, wherein the second terminal and the third terminal are located between the first coupling circuit and the second side of the insulating substrate.

8. The display device of claim 1, wherein the array substrate further comprising:
   signal lines provided in the display region and configured to supply pixel signals to the pixels;
   a second insulating film covering the signal lines; and
   an inorganic insulating film covering the first insulating film and the detection electrodes,
   wherein
   the signal lines are between the insulating substrate and the second insulating film,
   the sensor wiring is between the second insulating film and the first insulating film,
   the first insulating film is between the second insulating film and the inorganic insulating film, and
   the detection electrodes are between the first insulating film and the inorganic insulating film.

* * * * *